(12) United States Patent
Park et al.

(10) Patent No.: US 9,907,090 B2
(45) Date of Patent: Feb. 27, 2018

(54) METHOD AND APPARATUS FOR RANDOM ACCESS IN VIRTUAL CELL NETWORK SYSTEM

(71) Applicants: Samsung Electronics Co., Ltd., Gyeonggi-do (KR); Korea Advanced Institute of Science and Technology, Daejeon (KR)

(72) Inventors: Sung-Jin Park, Gyeonggi-do (KR); Min-Hoe Kim, Daejeon (KR); Byung-Chang Chung, Seoul (KR); Dong-Ho Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 54 days.

(21) Appl. No.: 14/912,072

(22) PCT Filed: Aug. 6, 2014

(86) PCT No.: PCT/KR2014/007281
§ 371 (c)(1),
(2) Date: Feb. 12, 2016

(87) PCT Pub. No.: WO2015/023079
PCT Pub. Date: Feb. 19, 2015

(65) Prior Publication Data
US 2016/0192392 A1 Jun. 30, 2016

(30) Foreign Application Priority Data
Aug. 14, 2013 (KR) ........................ 10-2013-0096746

(51) Int. Cl.
*H04W 74/00* (2009.01)
*H04W 74/08* (2009.01)
(Continued)

(52) U.S. Cl.
CPC ....... *H04W 74/008* (2013.01); *H04W 72/085* (2013.01); *H04W 74/0875* (2013.01); *H04W 72/02* (2013.01); *H04W 72/0446* (2013.01)

(58) Field of Classification Search
None
See application file for complete search history.

(56) References Cited

U.S. PATENT DOCUMENTS 6,792,273 B1 * 9/2004 Tellinger ............... H04W 28/26
370/331
2005/0053029 A1 3/2005 Lee et al.
(Continued)

FOREIGN PATENT DOCUMENTS

KR 10-2005-0024085 A 3/2005
KR 10-2009-0049971 A 5/2009
(Continued)

OTHER PUBLICATIONS

International Search Report dated Nov. 11, 2014 in connection with International Patent Application No. PCT/KR2014/007281; 2 pages.
(Continued)

*Primary Examiner* — Andrew Lai
*Assistant Examiner* — Jamaal Henson

(57) ABSTRACT

The present invention can reduce the clashing of random accesses by assigning a random access priority according to the number of links. A method for random access from a terminal in a virtual cell network system according to an embodiment of the present invention comprises the steps of determining the number of links that are connected to the terminal; selecting a random access set for random access on the basis of the number of links; selecting a slot resource for random access from the random access set on the basis of the number of links; and performing a random access over the
(Continued)

slot resource, wherein the slot resource includes a common resource held by a plurality of base stations.

18 Claims, 12 Drawing Sheets

(51) Int. Cl.
*H04W 72/08* (2009.01)
*H04W 72/02* (2009.01)
*H04W 72/04* (2009.01)

(56) References Cited

U.S. PATENT DOCUMENTS

| | | | |
|---|---|---|---|
| 2010/0227636 A1 | 9/2010 | Kwon et al. | |
| 2011/0216700 A1 | 9/2011 | Moon et al. | |
| 2011/0235608 A1 | 9/2011 | Koo et al. | |
| 2011/0287777 A1* | 11/2011 | Yu | H04L 5/0023 455/452.1 |
| 2012/0087273 A1 | 4/2012 | Koo et al. | |
| 2013/0182680 A1 | 7/2013 | Choi et al. | |
| 2014/0016534 A1 | 1/2014 | Kim et al. | |
| 2014/0056243 A1* | 2/2014 | Pelletier | H04W 74/04 370/329 |
| 2014/0153390 A1* | 6/2014 | Ishii | H04W 76/023 370/230 |
| 2014/0334402 A1* | 11/2014 | Chen | H04L 5/0035 370/329 |

FOREIGN PATENT DOCUMENTS

| | | |
|---|---|---|
| KR | 10-2011-0100543 A | 9/2011 |
| KR | 10-2013-0084956 A | 7/2013 |
| WO | WO 2010/064794 A2 | 6/2010 |
| WO | WO 2012/134155 A2 | 10/2012 |

OTHER PUBLICATIONS

Written Opinion of the International Searching Authority dated Nov. 11, 2014 in connection with International Patent Application No. PCT/KR2014/007281; 4 pages.

\* cited by examiner

Transmission range

Ranged BS

DL RSS

Neighbor advertisement

1

METHOD AND APPARATUS FOR RANDOM ACCESS IN VIRTUAL CELL NETWORK SYSTEM

CROSS-REFERENCE TO RELATED APPLICATIONS AND CLAIM OF PRIORITY

The present application claims priority under 35 U.S.C. §365 to International Patent Application No. PCT/KR2014/007281 filed Aug. 6, 2014, entitled "METHOD AND APPARATUS FOR RANDOM ACCESS IN VIRTUAL CELL NETWORK SYSTEM", and, through International Patent Application No. PCT/KR2014/007281, to Korean Patent Application No. 10-2013-0096746 filed Aug. 14, 2013, each of which are incorporated herein by reference into the present disclosure as if fully set forth herein.

TECHNICAL FIELD

The present disclosure relates to a virtual cell network system and, more particularly, to a method and apparatus for a Random Access (RA) of a terminal in a mobile communication system.

BACKGROUND ART

In a virtual cell network system, a distribute small base station may be overlapped and included with multiple virtual cells by a Central Management Unit (CMU). The virtual cell network system may be a type of a system in which a plurality of distribute small base stations share a plurality of user terminals in a micro cell serviced by one physical space (e.g., a micro cell serviced by a micro base station).

FIG. 1 illustrates a situation in which one terminal is downlink or uplink-connected to a plurality of base stations in a virtual cell network system.

In the existing cellular system, generally, the distance between base stations is wide, and a terminal is usually connected to one base station or is connected to two base stations in a cell boundary area. A random access competitive composition in the cellular system may be defined as a plurality of random access attempts of the terminal for random access resources of one base station. However, when the distance between the base stations is relatively small as shown in the virtual network system of FIG. 1, a situation, in which a terminal existing in a cell boundary is connected to two or more base stations, frequently occurs.

As described above, in a situation in which the terminal is uplink-connected to the plurality of base stations in the virtual cell network system, there is a need to solve a random access collision problem in view of the terminal rather than the base station.

DETAILED DESCRIPTION OF THE INVENTION

Technical Problem

The present disclosure provides a method and apparatus for solving a random access collision problem in view of a terminal rather than a base station in a virtual cell network system.

Technical Solution

In accordance with an aspect of the present disclosure, there is provided a random access method of a terminal in a virtual cell network system. The random access method includes: determining a number of links connected to the terminal; selecting a random access set for random access on the basis of the number of links; selecting slot resources for the random access in the random access set on the basis of the number of links; and performing the random access through the slot resources, wherein the slot resources include common resources which a plurality of base stations have.

In accordance with an aspect of the present disclosure, there is provided a random access apparatus of a terminal in a virtual network system. The random access apparatus includes: a link number determination unit that determines a number of links connected to the terminal; a random access set selection unit that selects a random access set for random access on the basis of the number of links; a random access slot resource selection unit that selects slot resources for a random access based on the number of links in the random access set; and a controller that performs the random access through the slot resources, wherein the slot resources include common resources which a plurality of base stations have.

MODE FOR CARRYING OUT THE INVENTION

Figure 1:
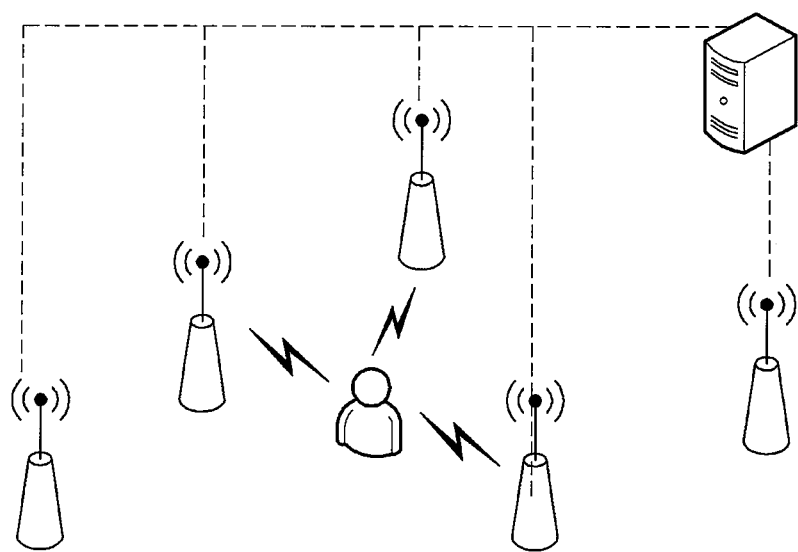
FIG. 1 illustrates a situation in which one terminal is downlink or uplink-connected to a plurality of base stations in a virtual cell network system.

Hereinafter, exemplary embodiments of the present invention will be described in detail with reference to the accompanying drawings. The same elements will be designated by the same reference numerals although they are shown in different drawings. Further, a detailed description of a known function and configuration which may make the subject matter of the present invention unclear will be omitted.

Further, terms or words used in the description and claims below should not be interpreted as only general or dictionary meanings, but interpreted as meanings and concepts satisfying the technical spirit of the present disclosure based on a principle in that the inventor can appropriately define his/her invention with a concept of the terms in order to describe the invention in the best method.

The present disclosure can be applied, without any adjustment, to a communication system to which a random access procedure is applied. Further, the present disclosure can be applied to a system supporting an uplink service.

The present disclosure considers a network environment in which a distribute small Base Station (BS) is considered as a basic unit and multiple distribute small BSs are bound to be operated in a virtual cell (or, cluster).

Figure 2:
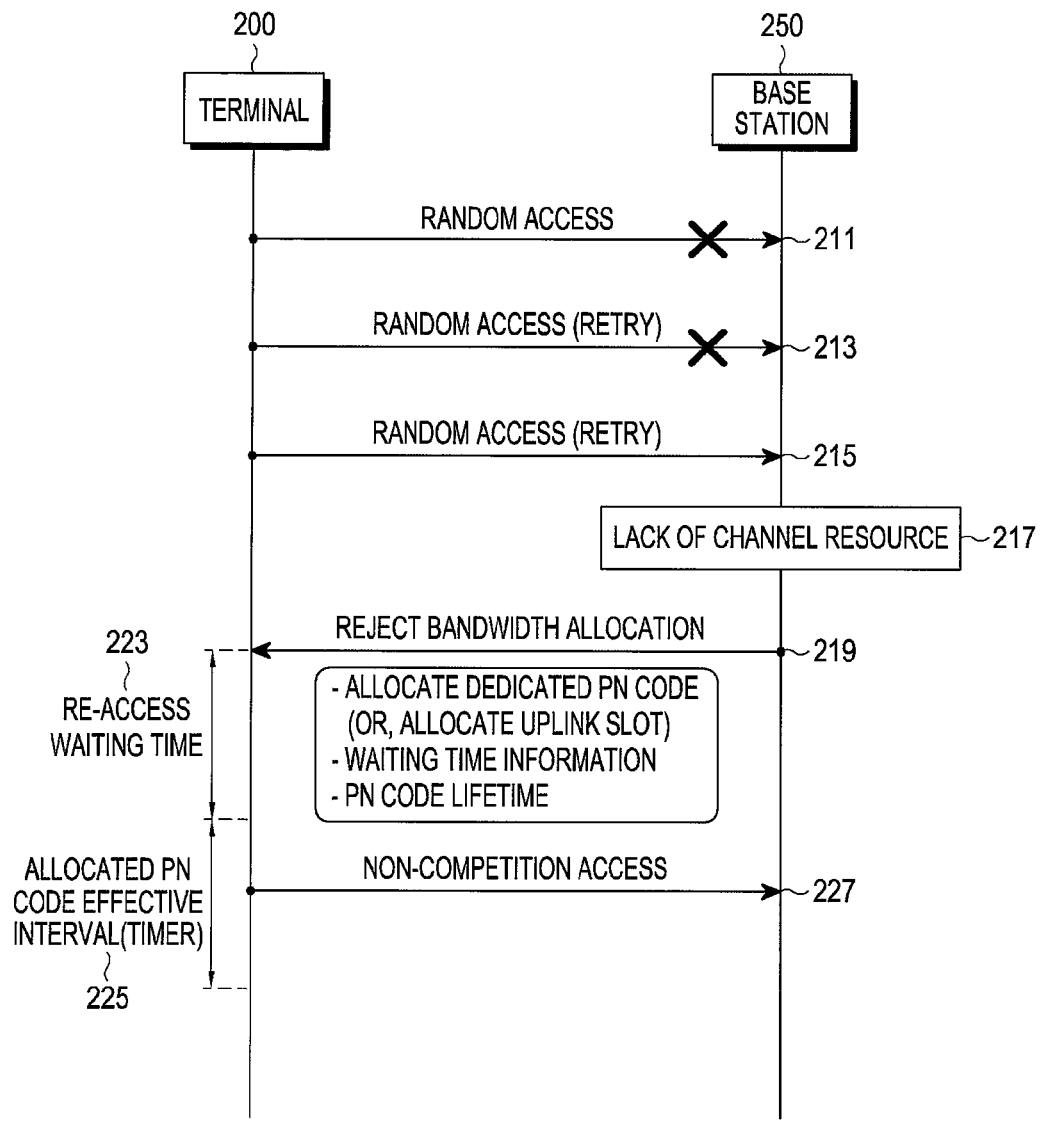
FIG. 2 illustrates an effective random access method in which a terminal accesses an uplink.

FIG. 2 illustrates an effective random access method in which a terminal accesses an uplink.

Referring to FIG. 2, a predetermined terminal 200 transmits, as indicated by reference numeral 211, an access request message (or, bandwidth allocation request message) through a contention-based channel in order to attempt an access to a base station 250. However, as described above, in the random access scheme, different terminals may simultaneously transmit the same request message, and, in this event, a collision may be generated in messages transmitted by the terminals.

When the collision is generated, as indicated by reference numeral 215, by the multiple messages transmitted from the terminals, the terminal 200 recognizes that transmission has failed, waits a back-off time, and then re-transmits, as indicated by reference numeral 213, the same request message.

However, the collision may again be generated by the same reason, and accordingly, the transmission fails, the terminal again waits a back-off time, and then the request message (e.g., a bandwidth allocation request message) can be transmitted to the base station through the third retransmission, as indicated by reference numeral 215.

As described above, since terminals can always attempt an access in any access section, the more the number of terminals which are being serviced increases, the more the collision is frequently generated so that an access delay and a degradation of service quality occurs.

Meanwhile, although a request message transmitted to the base station has been transmitted through two retransmissions in FIG. 2, a state, in which a bandwidth cannot be allocated according to a service request currently received from the terminal by the base station because resources in a base station system and a wireless channel section are lack, may occur as indicated by reference numeral 217. That is, a state, in which channel resources are lack, may occur. In this event, the base station transmits, as indicated by reference numeral 219, a message rejecting a service provision to the terminal. That is, even though the terminal has been diffi-cultly accessed through the retransmission as described above, a request for the access may be rejected according to the channel resource situation of the base station.

Therefore, the terminal receiving the access request rejection message (e.g., bandwidth request rejection message) repeats a message transmission procedure through any access channel as like the first access attempt. As described above, without a kind of service or a priority for services, when a terminal attempting the random access is currently rejected to provide a service due to a lack of resources even if the request message has been transmitted, the terminal should re-start the same access attempt procedure from the beginning.

There are various kinds of services provided as shown in the existing system, and a difference of a priority of the request messages transmitted from the terminal to the base station represents. Therefore, in order to satisfy various services and environments, in the access from the terminal to the base station, a more flexible access method according to the priority is required.

Further, when there is a lot of traffic of a wireless channel, the terminal ensures a QoS by processing data of the terminal according to a kind and a priority of pieces of data in a situation in which an uplink random access can be rejected. In detail, when a priority of data to be processed is high, the uplink random access is performed by a non-competitive access utilizing a dedicated Pseudo Noise (PN) code.

Figure 3:
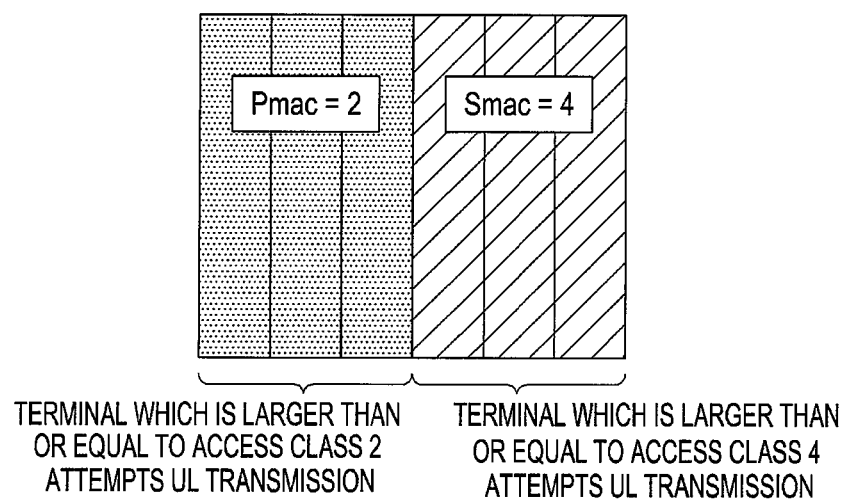
FIG. 3 is a random access channel structure diagram illustrating a method for preventing a collision through a terminal class division when two or more terminals attempt a random access.

FIG. 3 is a random access channel structure diagram illustrating a method for preventing a collision through a terminal class division when two or more terminals attempt a random access.

In FIG. 3, a plurality of random access slots existing in the given random access channel are divided equally and apply different minimum random access classes, respectively. That is, three random access slots of six random access slots are allocated to a Primary Minimum Access Class (PMAC) and the remaining three random access slots are allocated to a Secondary Minimum Access Class (SMAC). In the left three random access slots in FIG. 3, only terminals, in which PMAC is larger than or equal to 2, may perform the random access. In the right three random access slots in FIG. 3, only terminals, in which SMAC is larger than or equal to 4, may perform the random access. Therefore, terminals having a high priority and terminals having a low priority differently allocate random access slots which can perform the random access so that a situation, in which the terminals having the high priority competes with the terminals having the low priority, can be prevented. Further, the terminals having the high priority and the terminals having the low priority differently allocate the random access slots which can perform the random access so that a whole competition success probability can be adjusted by adaptively dividing the random access slots according to the number of the terminals having the high priority and the number of the terminals having the low priority, which exist in the system.

In this event, a service type based on a delay between the terminals and a priority for a service are assigned to the classes and thus a collision is minimized when the random access is attempted. When a terminal of a high class attempts the random access by dividing random accessible resource slots for each class, the collision is allowed to be reduced.

However, as like the virtual cell network system, a terminal, which has a lot of upward base station links in an environment in which many small base stations are distributed, has a high possibility to interrupt access of the terminals through the random access. However, points as shown in FIGS. 2 and 3 have not been considered in the prior art. That is, only a situation in which a plurality of terminals access one base station has been considered as a competitive composition, but a situation in which the plurality of terminals access a plurality of base stations has not been considered.

In other words, in the existing system, a base station-oriented random access based on a channel or a data priority is performed. However, when the random access is considered as a base station selection problem, a probability, in which the terminal having a lot of links collide with terminals belonging to neighbor base stations, increases so that a new random access problem occurs. Therefore, in the present disclosure, a scheme for enabling this to be properly controlled is required. That is, the present disclosure resolves a random access collision problem which can be newly generated when a proposed system is introduced through a random access design based on the number of links.

The present disclosure proposes an uplink random access scheme based on the number of links connected to the plurality of base stations by the terminal in an environment in which a plurality of small base stations exist. An operation according to the embodiment of the present disclosure is configured by three steps below.

1) in a first step, a terminal identifies the number of connected links and available random access resources from neighbor base stations. The random access resource may be, for example, a time, a frequency, or the like.

2) in a second step, the terminal performs a competition based random access by individually adjusting a back-off time or selecting a random access resource area based on the number of links connected to the terminal itself.

3) in a third step, a base station receiving a random access request transfers a random access response to the terminal and the terminal determines whether the terminal itself successes a random access.

Hereinafter, a random access method in a virtual cell network system according to the embodiment of the present disclosure will be described using the three steps of the present disclosure.

1) Method of Identifying the Number of Links in a Terminal

The number of links described in the present disclosure may be organized into four as shown in FIGS. 4A to 4D.

Figure 4A:
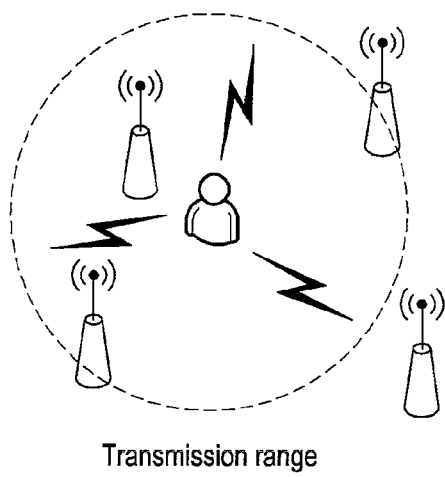
FIGS. 4A to 4D illustrate a definition of the number of links according to an embodiment of the present disclosure.

First, the number of links connected to a terminal in FIG. 4A may be defined as the number of base stations receiving a reference signal which is larger than or equal to a predetermined threshold value when an uplink sounding reference signal is transmitted to the base stations. That is, the number of links may be defined as the number of base stations ranged from a preamble transmission range of the terminal.

Figure 4B:
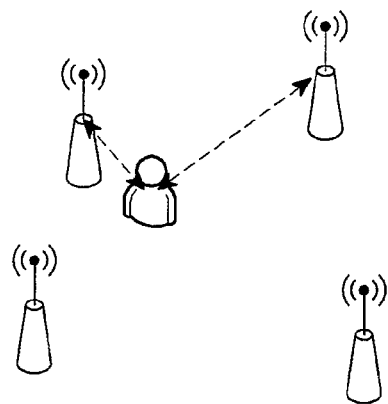

Second, the number of links connected to a terminal in FIG. 4B may be defined as the number of base stations with which the terminal performs a ranging process. In this event, the base station performing the ranging process may be referred to as a base station which is synchronized with the terminal.

Figure 4C:
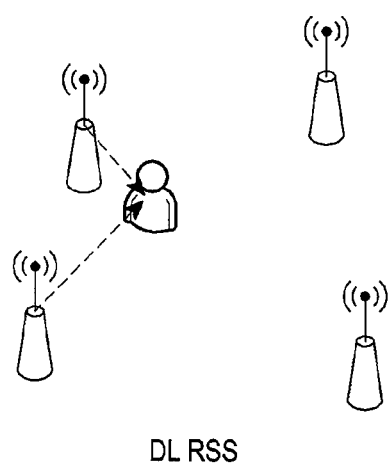

Third, the number of links connected to a terminal in FIG. 4C may be defined as the number of base stations with which the terminal can receive a reference signal which is larger than or equal to a predetermined threshold value in a situation in which individual base stations transmit a BS specific reference signal.

Figure 4D:
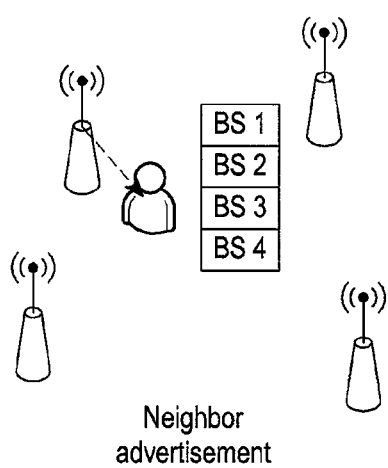

Fourth, the number of links connected to a terminal as shown in FIG. 4D may be defined as the number of base stations with which a terminal exists in an active set of a terminal through a neighbor advertisement message of neighbor base stations during a scanning process.

As described above, although four cases of the number of links are defined as an example of the present disclosure, everything defining the number of links as a measured value of a base station or a terminal while having a similar aspect can be utilized as the number of links used in the present disclosure.

2) Transmitting a Random Access Based on the Number of Links of a Terminal

Figure 5A:
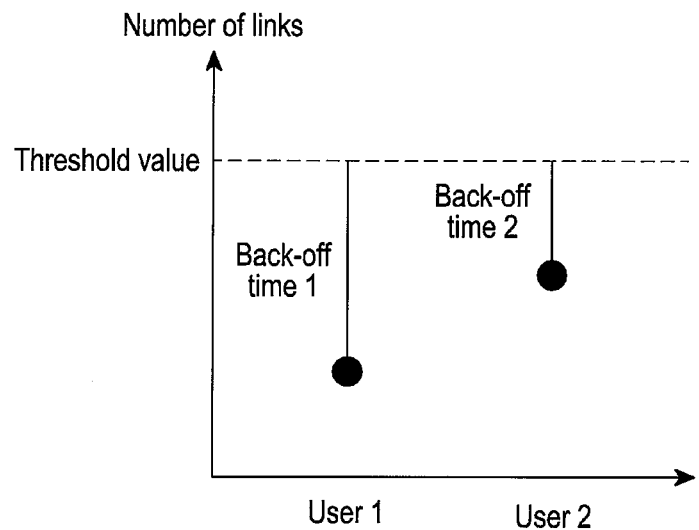
FIGS. 5A and 5B illustrate a scheme of performing a random access based on the number of links according to an embodiment of the present disclosure.
Figure 5B:
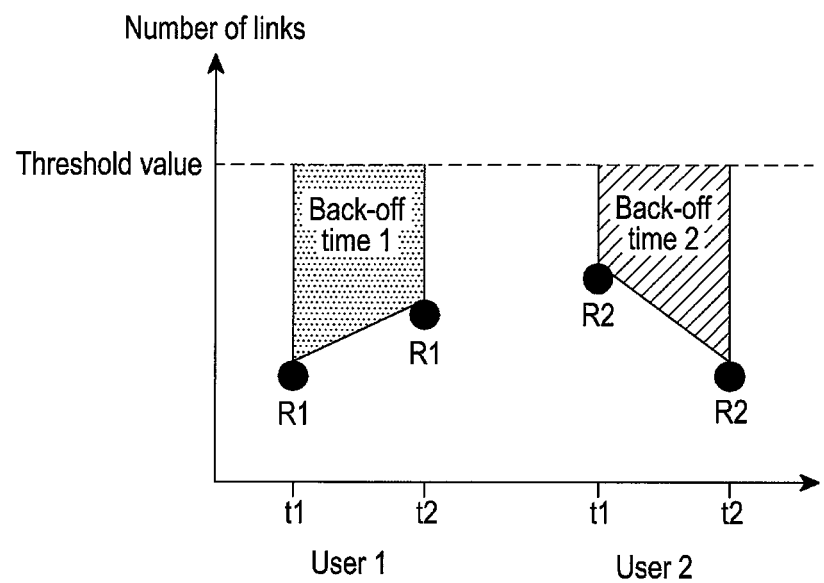

FIGS. 5A and 5B illustrate a scheme of performing a random access based on the number of links according to an embodiment of the present disclosure.

As described above, a competition based random access scheme of a terminal in a virtual cell network system according to the embodiment of the present disclosure corresponds to a random access scheme based on the number of links which is not a scheme based on a channel or a load of the terminal. In addition, a situation in which all base stations has the same random access resources is considered. Therefore, the terminal having links connected to a plurality of base stations can perform a random access to the plurality of base stations through one random access resource. In this event, since the more the links which a terminal has, the higher the possibility that the terminal may have a random access collision influence on other terminals, a scheme of designing a back-off timer of the terminal by deciding a priority is performed or a random access is performed by selecting the random access resource area. In a reference of configuring a back-off timer, a method in which the larger the number of links, the longer the back-off time, or the less the number of links, the longer the back-off time exists. Or, the reverse method thereof may be applied. Furthermore, a back-off time design considering a channel/link change by a mobility of the terminal is also included. Since a channel/link situation when configuring the back-off time is different from a channel/link situation when performing an actual random access or transmitting uplink data, information which can correct this is required.

In summary, the random access scheme based on the number of links is largely divided into an access scheme through a back-off time design and a scheme of performing an access by selecting the random access resource area. First, a back-off time design which is a first scheme can be designed by two metrics.

FIG. 5A illustrates a method of performing a random access on the basis of information on the number of links obtained at a point.

$$\text{back-off time} = (X - R_k) \quad \text{[Equation 1]}$$

Referring to <Equation 1>, a back-off time may be determined based on $X - R_k$. As a possible embodiment, the back-off time may be determined based on $X/R_k$. In this event, X refers to a link threshold value, and Rk refers to the number of links of a terminal k. <Equation 1> performs a random access on the basis of link information obtained at a point.

FIG. 5B illustrates a method for performing a random access on the basis of link information obtained during a predetermined time.

$$\text{back-off time} = (X - R_k^1) + (X - R_k^2) \quad \text{[Equation 2]}$$

Referring to <Equation 2>, a back-off time may be determined based on $(X - R_k^1) + (X - R_k^2)$. As a possible embodiment, the back-off time may be determined based on $(X/R_k^1) + (X/R_k^2)$. In this event, $R_k^t$ refers to the number of links of the terminal k at a t time point. In the present disclosure, although two time points have described, the same scheme can be applied at a N(N>2) time point. Herein, N refers to the number of time points. That is, <Equation 2> refers to a case in which the number N of time points is 2. That is, a user decides how many time points at which links are measured in order to design the back-off time. <Equation 1> refers to a case in which the back-off time is determined based on the number of links decided at one time point, and <Equation 2> refers to a case in which a back-off time is determined based on the number of links decided at different two time points. A back-off time for any N time point may be determined as shown in <Equation 3> or <Equation 4> below.

$$\text{back-offtime}=(X-R_k^1)+(X-R_k^1)+EEE+(X-R_k^N) \qquad \text{[Equation 3]}$$

$$\text{back-offtime}=(X/R_k^1)+(X/R_k^2)+\ldots+(X/R_k^N) \qquad \text{[Equation 4]}$$

Figure 6A:
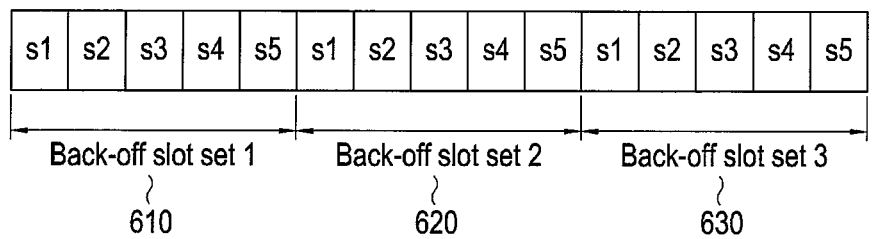
FIGS. 6A and 6B illustrate a scheme of performing a random access based on the number of links according to another embodiment of the present disclosure.
Figure 6B:
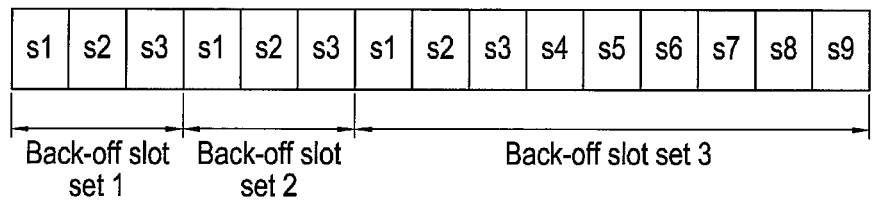

FIGS. 6A and 6B illustrate a scheme of performing a random access based on the number of links according to another embodiment of the present disclosure.

A scheme of performing an access by selecting a random access resource area is similar to two schemes used in the back-off time, and the obtained result does not refer to a value (t) of time, but refers to a resource area. Therefore, the terminal selects a random access slot set based on the number of links determined above so that a competition between terminals having the same number of links is induced. Herein, the random access slot set may be configured by a plurality of random access slots, and thus even two terminals selecting the same random access slot set can increase a collision prevention effect. Herein, the random access slot set may correspond to a pre-defined set between the terminal and the base station.

FIG. 6A illustrates a case in which five slots exist for each random access slot set. In this event, when users belonging to one set are larger than users belonging to another set by estimating a distribution of users for each set in view of a long-term, a slot included in a corresponding set can be extended.

FIG. 6B illustrates a case in which the different numbers of slots can be adjusted to be for each random access set.

As shown in FIG. 6B, the number of slots may be adaptively adjusted according to a ratio of users for each set. To this end, a Central Management Unit (CMU) measures a ratio of users according to the number of links. An example of the measuring method is below.

In the first and second cases in the definition of the link, the CMU may directly collect information of the terminal from the base station, calculate the number of links for each terminal, and estimate a ratio of users according to the number of links.

The CMU can use the estimated ratio of the users during a predetermined time window (e.g., a superframe unit). The CMU may adjust a back-off slot set ratio according to the estimated ratio of the users. In a situation in which a maximum of three links can be formed, when a ratio of users according to the number of links corresponds to 20%, 20%, and 60%, respectively, the CMU configures the number of slots for each random access set as shown in FIG. 6B. The CMU broadcasts, to the terminal, back-off slot set configuration ratio information together with random access resource location information.

Meanwhile, in order to prevent a case in which the same terminal sequentially attempts the random access and interrupts fairness, the present disclosure provides a random access method of the terminal considering the fairness. A related utility function is designed as shown in <Equation 5> below.

$$\text{Backoff time}=\ln\left(c+\frac{(\text{number of continuous attempt})^\alpha}{\text{measure of links}}\right) \qquad \text{[Equation 5]}$$

Herein, c is a proportional constant, and "number of continuous attempt" refers to the number of times in which a random access of a terminal is performed during a predetermined time. In <Equation 5>, α determines how many times of the random access attempt will be additionally reflected. When α is large, it refers to that the number of times of the random access attempt is additionally reflected.

Figure 7:
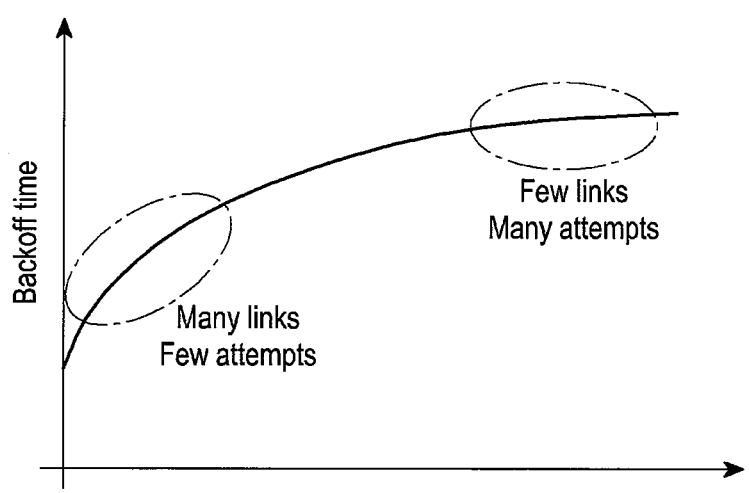
FIG. 7 illustrates the trend of a utility function considering fairness.

FIG. 7 illustrates the trend of a utility function considering fairness.

Referring to FIG. 7, a terminal has a lot of links and the fewer random access which a terminal attempts, the shorter a back-off time during a predetermined time, thereby having a high priority of the random access. On the contrary, the more a terminal has small links and attempts a lot of random access during a predetermined time the more the terminal has large back-off time, thereby having a low priority of the random access. Through the same scheme, the terminals may have a fairness access opportunity.

Figure 8:
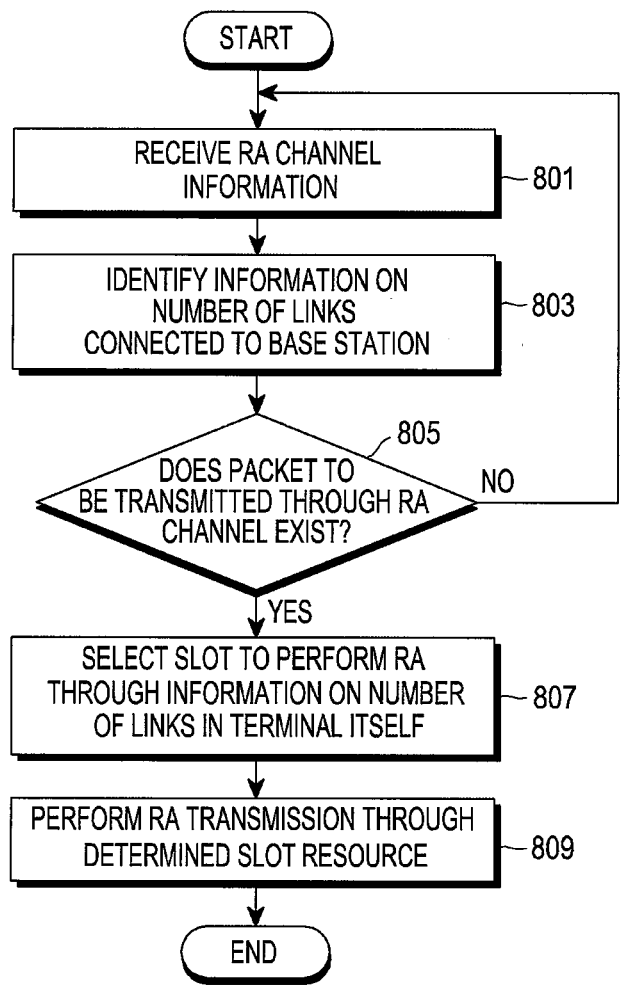
FIG. 8 is a flowchart illustrating a random access method of a terminal based on the number of links according to an embodiment of the present disclosure.

FIG. 8 is a flowchart illustrating a random access method of a terminal based on the number of links according to an embodiment of the present disclosure.

In step 801, the terminal receives random access channel information. In step 803, the terminal identifies the number of links connected to base stations based on the received random access channel information. The terminal identifying the number of links determines whether a packet to be transmitted through a random access channel exists in step 805. When the packet does not exists, the terminal returns to step 801. However, when the packet exists, in step 807, the terminal selects a random access slot set to perform a random access based on information of the number of links in the terminal itself among a plurality of random access slot sets, and determines a slot to perform the random access in the selected random access slot set. In this event, a process of selecting the random access slot set may be omitted.

In a Long Term Evolution (LTE) standard, a non-competition based/competition based random access scheme is used to reduce a collision, and the competition based scheme thereof is operated by dividing a preamble set into two parts. Further, the present disclosure can apply the same operation method.

The terminal performs random access transmission through the determined slot resources in step 809. The slot resources include common resources having the plurality base stations. As described above, according to the embodiment of the present disclosure, a random access collision probability, which is caused by a terminal having the large number of links, in the plurality of base stations can be reduced.

3) Random Access Response Reception of a Terminal

Before random access response reception of a terminal is described, a random access success will be newly defined below in another embodiment of the present disclosure.

When the terminal performs the random access by links (the number of L) connected to the terminal itself, the terminal defines the random access as a success when it has received a response from the base station for at least s(s=[L/d]). For example, when d is L, s is one and a value of d is configured as a value which is less than a value of L. Further, the terminal can acquire uplink timing with a plurality of base stations by ensuring a link connection over a predetermined ratio, and this may be utilized during uplink cooperation. The value of d is determined according to a kind (or, QoS level) of services to be transmitted to the uplink.

When there are a terminal 1, a terminal 2, and three links, in a case in which an s value of the terminal 1 or the terminal 2 is 1, it is determined that the random access succeeds. However, when the s value of the terminal 1 or the terminal 2 is larger than or equal to 2, it is determined that the random access has failed.

When the plurality of base stations have received the random access from one terminal, a random access response may be transmitted to the terminal in two schemes by a central management unit.

Figure 9A:
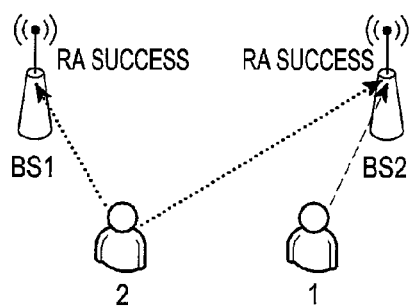
FIGS. 9A and 9B illustrate a random access response scheme in a separate base station scheme according to an embodiment of the present disclosure.
Figure 9B:
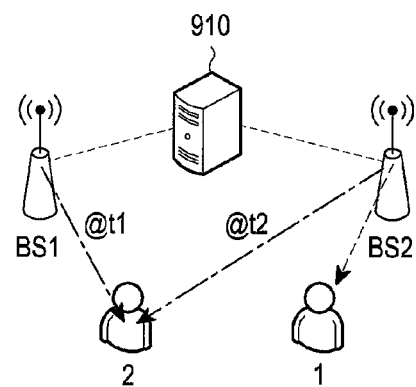

The first scheme corresponds to a scheme in which base stations successively receiving the random access as shown in FIG. 9A individually transmit, a Central Management Unit (CMU) 910, a random access response message to the terminal using different timings or resource areas as shown in FIG. 9B. The first scheme has been illustrated in FIGS. 9A and 9B. As an available example, without the CMU 910, the random access response message may be individually transmitted to the terminal through communication between base stations.

Figure 10A:
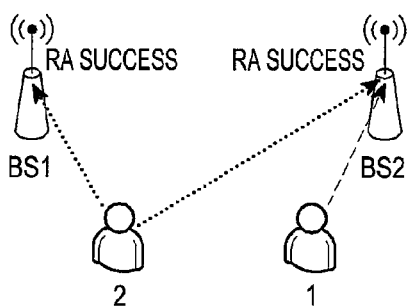
FIGS. 10A and 10B illustrate a random access response scheme in a representative base station scheme according to an embodiment of the present disclosure.
Figure 10B:
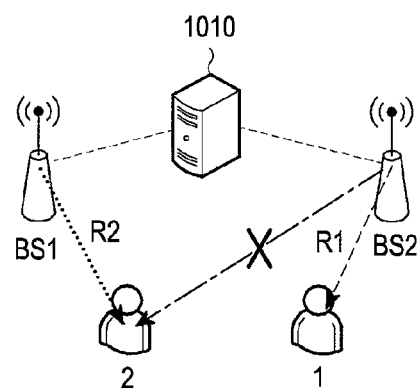

Next, a second scheme corresponds to a scheme in which a representative base station of base stations successively receiving the random access as shown in FIG. 10A performs a random access response by collecting pieces of information to be transmitted by another base station as shown in FIG. 10B. Herein, a base station having a few serving terminals (i.e., low traffic) may perform the random access response or a base station, in which a channel state with a corresponding terminal is best, becomes a representative base station, thereby performing the response. Information on another base station which is not the representative base station may be received from a central management unit 1010 and may be received by communication between base stations. The second scheme has been illustrated in FIGS. 10A and 10B.

Figure 11:
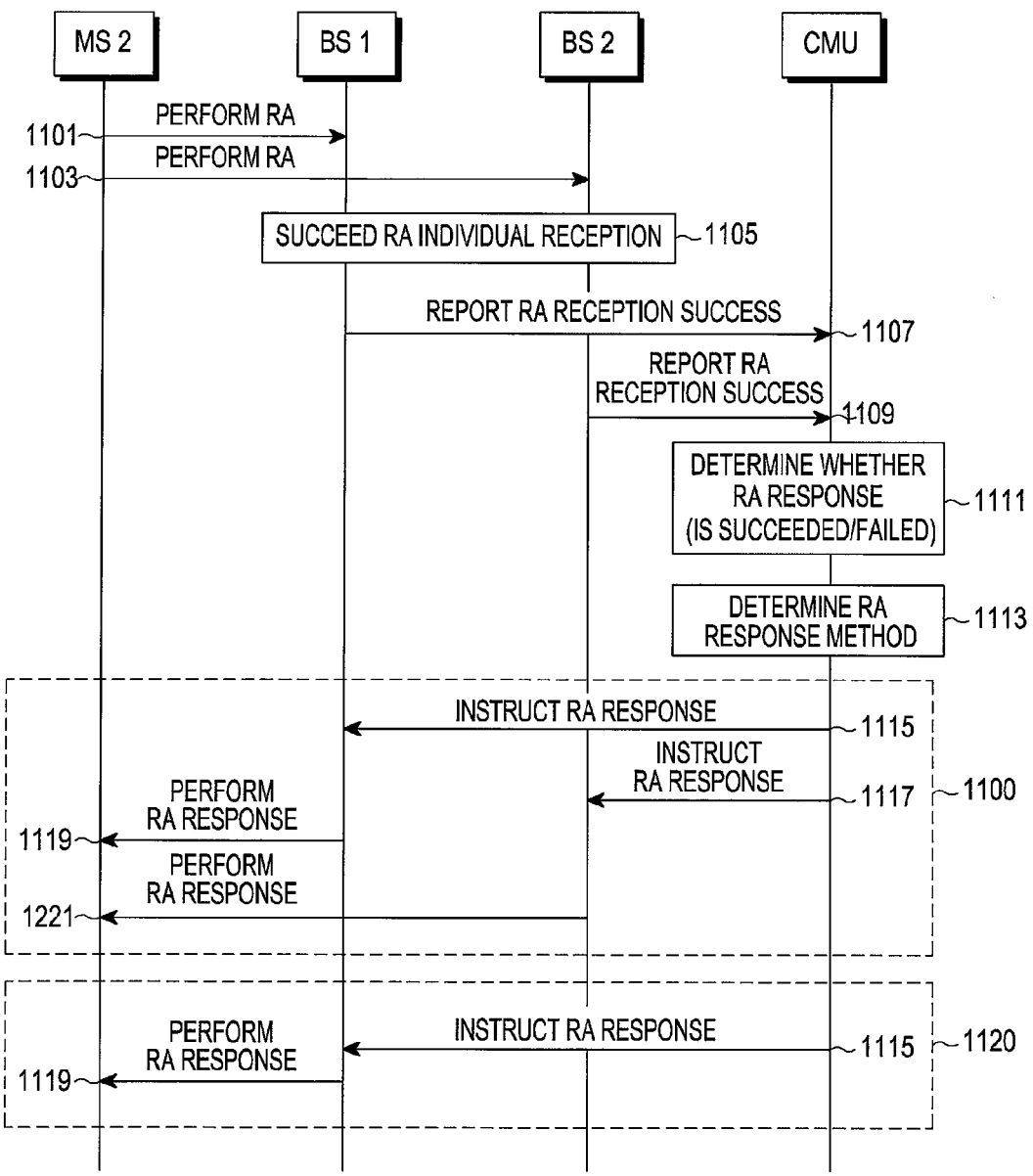
FIG. 11 is a scenario illustrating a method of receiving a random access response message according to another embodiment of the present disclosure.

FIG. 11 is a scenario illustrating a method of receiving a random access response message according to another embodiment of the present disclosure.

It is noted that an operation of a Central Management Unit (CMU) to be described below corresponds to an operation which can also be progressed in a BS1 and a BS2.

The terminal makes a request for (steps 1101 and 1103) a random access to two or more base stations (BS1 and BS2) and then each base station identifies whether a random access for a corresponding terminal is received in step 1105 and reports this to the CMU in steps 1107 and 1109. Further, the CMU identifies a success condition of the random access of the corresponding terminal (i.e., determines a parameter s described above) in step 1111 and determines which base station performs a response for the random access in step 1113. Which base station performs a response for the random access has been described with reference to FIGS. 9A, 9B, 10A, and 10B.

Then, the CMU transfers the random access response message to at least one base station according to the determined method in step 1113. When the base stations are directly connected to each other without the CMU, the BS1 or the BS2 act as the CMU, and may perform a determination and an instruction for a neighbor base station.

When a random access response scheme in an individual base station scheme has been selected (reference numeral: 1100), the CMU transmits a random access response instruction message to the BS1 and the BS2 in steps 1115 and 1117. Then, the BS1 and BS 2 performs, to the terminal, a random access response procedure in steps 1119 and 1121.

Meanwhile, when a random access response scheme in a representative base station scheme has been selected (reference numeral: 1120), the CMU determines, for example, the BS1 as the representative base station and transmits the random access response instruction message to the BS1 in step 1123. Then, the BS1 performs the random access response procedure to the terminal in step 1125.

Figure 12:
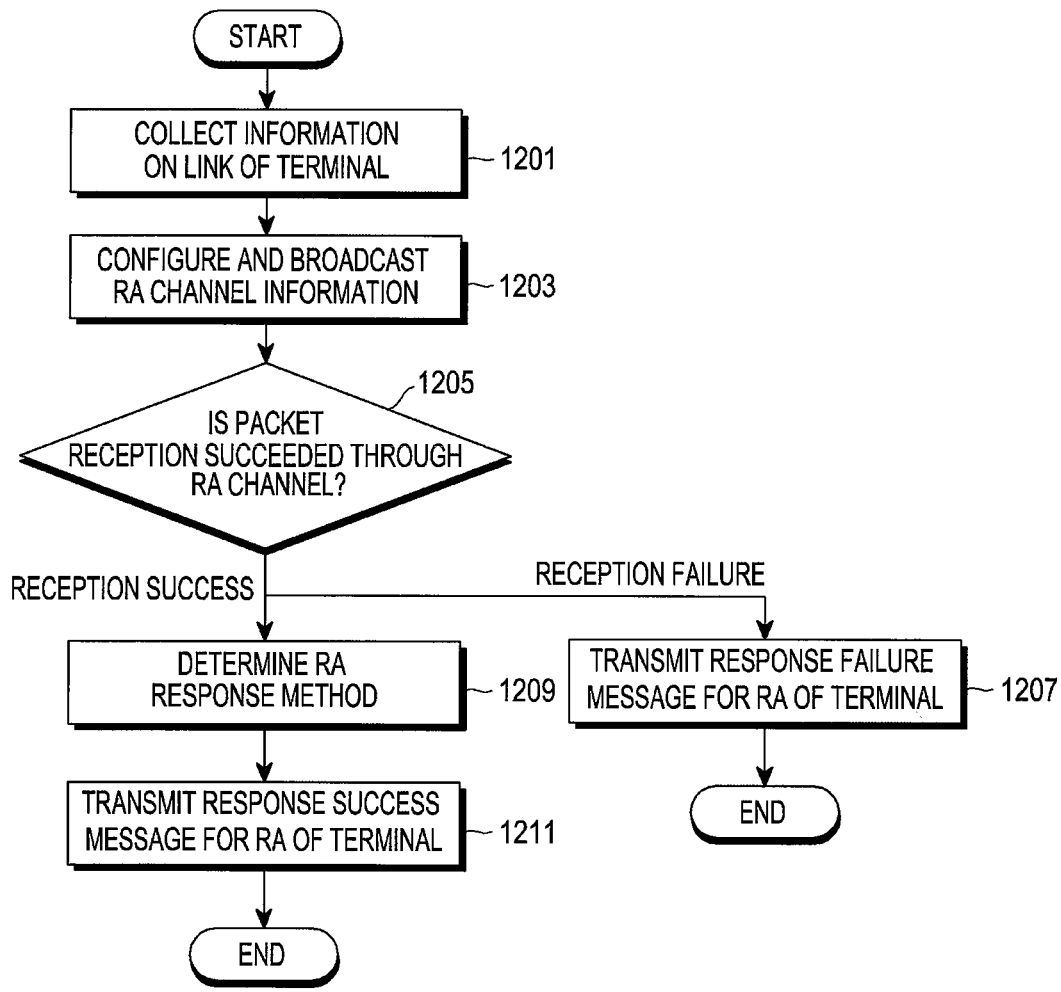
FIG. 12 is a flowchart illustrating a random access response method in a Central Management Unit (CMU) according to another embodiment of the present disclosure.

FIG. 12 is a flowchart illustrating a random access response method in a Central Management Unit (CMU) according to another embodiment of the present disclosure.

The CMU collects link information of a terminal in step 1201, configures channel information on the basis of the collected link information of the terminal in step 1203, and broadcasts the channel information to the terminal.

The CMU determines whether a packet has been successively received through a random access channel in step 1205. When the packet has not been successively received, the CMU transmits, to the terminal, a response failure message for the random access of the terminal through the base station in step 1207.

However, when the packet has been successively received, the CMU determines a random access response method in step 1209. Which base station performs a response for the random access has been described with reference to FIGS. 9A, 9B, 10A, and 10B. Further, step 1209, in which the random access response method is determined, is identical to that the random access response method is determined in step 1113 of FIG. 11.

When the random access response method is determined, the CMU transmits, to the terminal, a response success message for the random access of the terminal through the base station according to the determined method, in step 1211. As described above, according to the embodiment of the present disclosure, a random access collision probability, which is caused by a terminal having the large number of links, in the plurality of base stations can be reduced.

Figure 13:
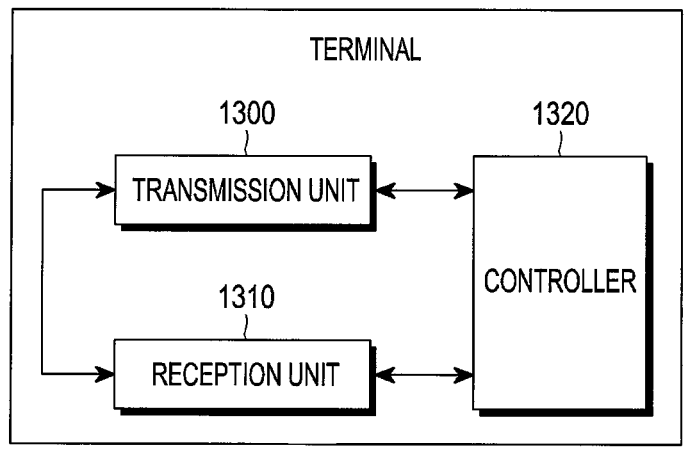
FIG. 13 is a block diagram illustrating a structure of the terminal according to an embodiment of the present disclosure.

FIG. 13 is a block diagram illustrating a structure of a terminal according to an embodiment of the present disclosure.

Referring to FIG. 13, a terminal includes a transmission unit 1300, a reception unit 1310, and a controller 1320.

According to the embodiment of the present disclosure, the transmission unit 1300 and the reception unit 1310 include a transmission module and a reception module for transmitting and receiving data to and from a base station in a communication system.

According to the embodiment of the present disclosure, the controller 1120 identifies the number of links connected to the base station, selects a set to perform a random access based on the number of links, selects a slot in the selected set, and performs a random access through the selected slot resources. In this event, the slot may be selected based on the number of links without an operation of selecting the set to perform the random access. The slot resources are common resources which a plurality of base stations have.

As an enabling example, a link number determination unit not shown in drawings determines the number of link connected to the terminal, and a random access set selection unit not shown in the drawings selects a random access set for the random access based on the number of links.

The random access set selection unit not shown in the drawings selects slot resources for the random access in the random access set, and the controller 1120 performs a random access through the slot resources.

Figure 14:
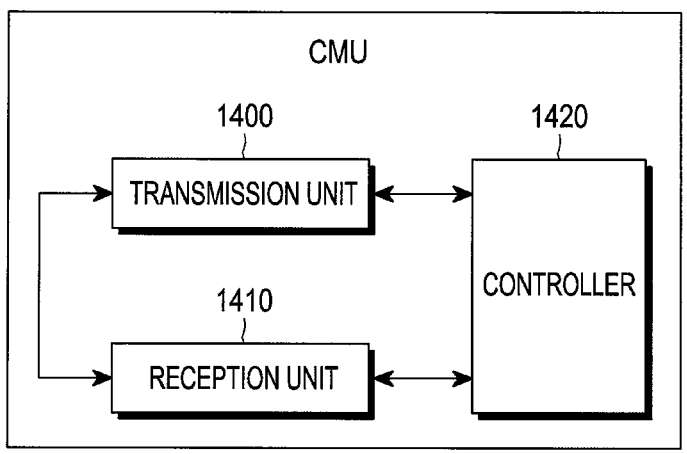
FIG. 14 is a block diagram illustrating a structure of the CMU according to an embodiment of the present disclosure.

FIG. 14 is a block diagram illustrating a structure of the CMU according to an embodiment of the present disclosure.

Referring to FIG. 14, the CMU includes a transmission unit 1400, a reception unit 1410, and a controller 1420. Although not shown in the FIG. 14, a view for the structure of the CMU can also be applied to a base station.

According to the embodiment of the present disclosure, the transmission unit 1400 and the reception unit 1410 include a transmission module and a reception module for transmitting and receiving data to and from a terminal through the base station, respectively.

When the controller 1420 collects link information of the terminal and successfully receives a packet through a random access channel, the controller determines a response message transmission scheme and transmits a random access response message to the terminal through the base station according to the determined scheme. The controller 1420 determines whether which base station performs a response for the random access. It has been described that which base station performs a response for the random access, with reference to FIGS. 9A, 9B, 10A, and 10B.

Figure 15:
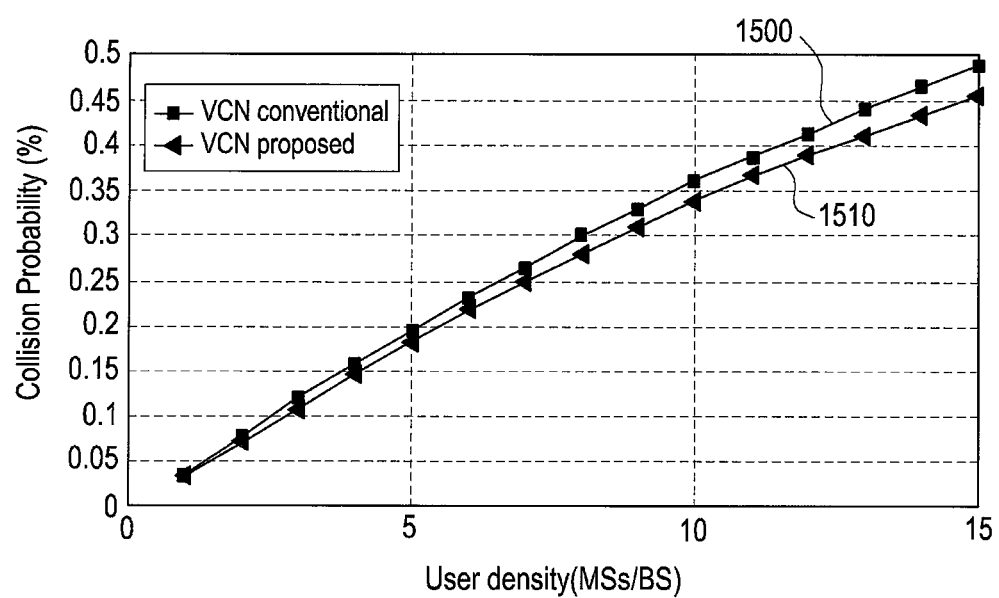
FIG. 15 is a graph in which a random access collision ratio in an existing scheme is compared with a random access collision ratio in a scheme according to an embodiment of the present disclosure in the virtual cell network system.

FIG. 15 is a graph in which an existing scheme in the virtual cell network system is compared with a random access collision ratio of a scheme according to an embodiment of the present disclosure.

Reference numeral 1500 refers to a case in which RA resource blocks according to the number of links are used without distinction, and reference number 1510 refers to a case in which RA resource blocks according to the number of links are separately used. For example, it is assumed that RA0 to RA3 are used when the number of links is five and RA17 to RA20 are used when the number of links is one.

The present disclosure may identify, through FIG. 15, that a collision probability of about 5% to 10% compared to the existing collision probability is reduced.

The present disclosure may reduce a random access collision by giving different priorities according to the number of links.

The present disclosure may reduce an RA collision probability, caused by the terminal having a large number of links, in a plurality of base stations.

Further, the apparatus and method according to the present disclosure can be implemented as a computer-readable code in a computer-readable recording medium. The computer-readable recording medium includes all types of recording devices which store data readable by a computer system. An example of the computer readable recording medium includes a ROM, a RAM, a CD-ROM, a magnetic tape, a floppy disk, an optical data storing device, and the like, and also includes an implementation in the form of a carrier wave, e.g., transmission through the Internet.

Although the present disclosure has been described above, it is understood by those skilled in the art which the present disclosure pertains to that the present disclosure may be variously substituted, varied, and modified without departing from the technical spirit and scope of the present disclosure, and is not limited to the above-described embodiments and the accompanying drawings.

The invention claimed is:

1. A random access method of a terminal in a virtual cell network system, the random access method comprising:
    determining a number of links connected to the terminal;
    selecting slot resources for random access based on the number of links; and
    performing the random access through the slot resources,
    wherein the number of links is defined as one among:
        a number of base stations ranged from a preamble transmission range of the terminal;
        a number of base stations with which the terminal performs a ranging process;
        a number of base stations in which a downlink channel estimation result is higher than a predetermined threshold value; and
        a number of base stations that exist in an active set of the terminal through a neighbor advertisement message received by the terminal.

2. The random access method of claim 1, further comprising:
    selecting a random access set for a random access based on a number of times in which the terminal has performed the random access during a predetermined time, and the number of links.

3. The random access method of claim 1, wherein the virtual cell network system corresponds to a communication system managing small base stations, and the small base stations have the same random access resources.

4. The random access method of claim 1, further comprising:
    performing the random access by differently configuring a back-off time based on the number of links.

5. The random access method of claim 4, wherein the back-off time uses one of a value measured at one time point and a sum of values measured at multiple time points.

6. The random access method of claim 1, further comprising:
    selecting a random access set for the random access based on the number of links.

7. The random access method of claim 1, further compromising:
    collecting link information of the terminal through a base station in a center manager;
    determining whether a packet has been successively received through a random access channel;
    when the packet has been successively received, determining a random access response message transmission scheme; and
    transmitting a random access response message to at least one base station according to the determined scheme.

8. The random access method of claim 7, wherein the random access response message transmission scheme comprises a scheme of performing a random access response by collecting random access response information, received from each base station, of the terminal and allocating individual resources to each base station, by a central manager.

9. The random access method of claim 7, wherein the random access response message transmission scheme comprises a scheme of performing the random access response by selecting one representative base station and allocating resources to the selected representative base station, by a central manager.

10. A random access apparatus of a terminal in a virtual cell network system, the random access apparatus comprising:
    a controller configured to:
        determine a number of links connected to the terminal,
        select slot resource for a random access based on the number of links,
        perform the random access through the slot resources, wherein the number of links is defined as one among:
- a number of base stations ranged from a preamble transmission range of the terminal;
- a number of base stations with which the terminal performs a ranging process;
- a number of base stations in which a downlink channel estimation result is higher than a predetermined threshold value; and
- a number of base stations that exist in an active set of the terminal through a neighbor advertisement message received by the terminal.

11. The random access apparatus of claim 10, further comprising:
a random access set selector that selects a random access set for a random access based on a number of times in which the terminal has performed the random access during a predetermined time, and the number of links.

12. The random access apparatus of claim 10, wherein the virtual cell network system corresponds to a communication system managing small base stations, and the small base stations have the same random access resources.

13. The random access apparatus of claim 10, wherein the controller performs the random access by differently configuring a back-off time based on the number of links.

14. The random access apparatus of claim 13, wherein the back-off time uses one of a value measured at one time point and a sum of values measured at multiple time points.

15. The random access apparatus of claim 10, further comprising:
a random access set selector that selects a random access set for the random access based on the number of links.

16. The random access apparatus of claim 10, further comprising:
a controller that collects link information of the terminal through a base station in a center manager, determines whether a packet has been successively received through a random access channel from the terminal, and, when the packet has been successively received, determines a random access response message transmission scheme; and
a transmitter that transmits a random access response message to at least one base station according to the determined scheme.

17. The random access apparatus of claim 16, wherein the random access response message transmission scheme comprises a scheme of performing a random access response by collecting random access response information, received from each base station, of the terminal and allocating individual resources to each base station, by a central manager.

18. The random access apparatus of claim 16, wherein the random access response message transmission scheme comprises a scheme of performing the random access response by selecting one representative base station and allocating resources to the selected representative base station, by a central manager.

* * * * *